(No Model.) 2 Sheets—Sheet 1.

F. E. CADY.
COMBINED WATER FILTER AND COOLER.

No. 296,673. Patented Apr. 8, 1884.

Witnesses:

Inventor
Frank E. Cady
by Alex Mahon
Attorney

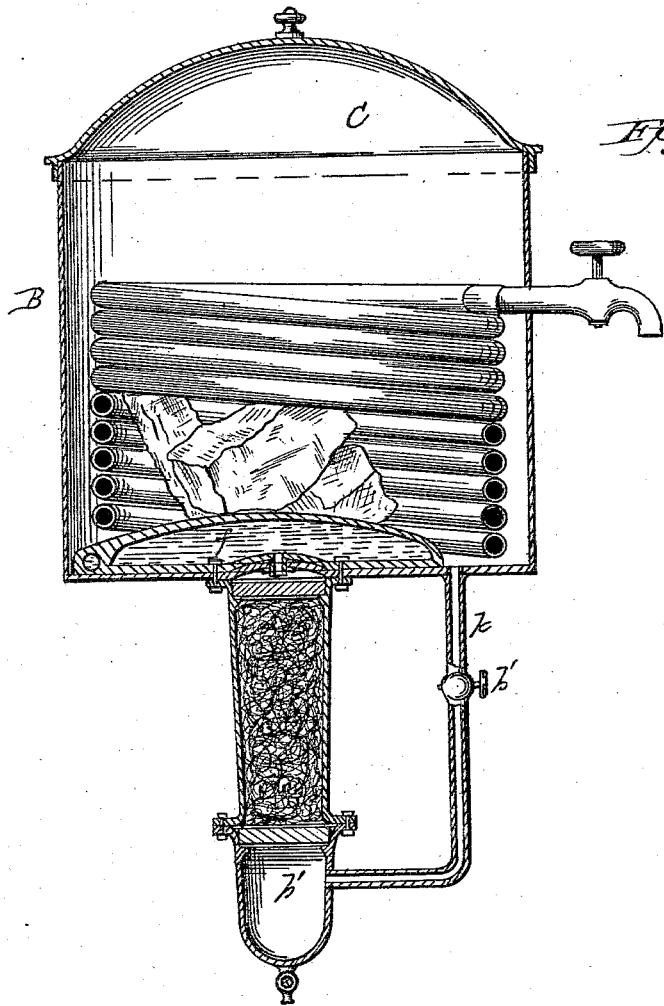

UNITED STATES PATENT OFFICE.

FRANK E. CADY, OF AUBURN, NEW YORK.

COMBINED WATER FILTER AND COOLER.

SPECIFICATION forming part of Letters Patent No. 296,673, dated April 8, 1884.

Application filed December 5, 1883. (No model.)

*To all whom it may concern:*

Be it known that I, FRANK E. CADY, of Auburn, county of Cayuga, State of New York, have invented certain new and useful Improvements in Combined Water Filters and Coolers, of which the following is a full and exact description, reference being had to the accompanying drawings, making part of this specification, in which—

Figure 1:
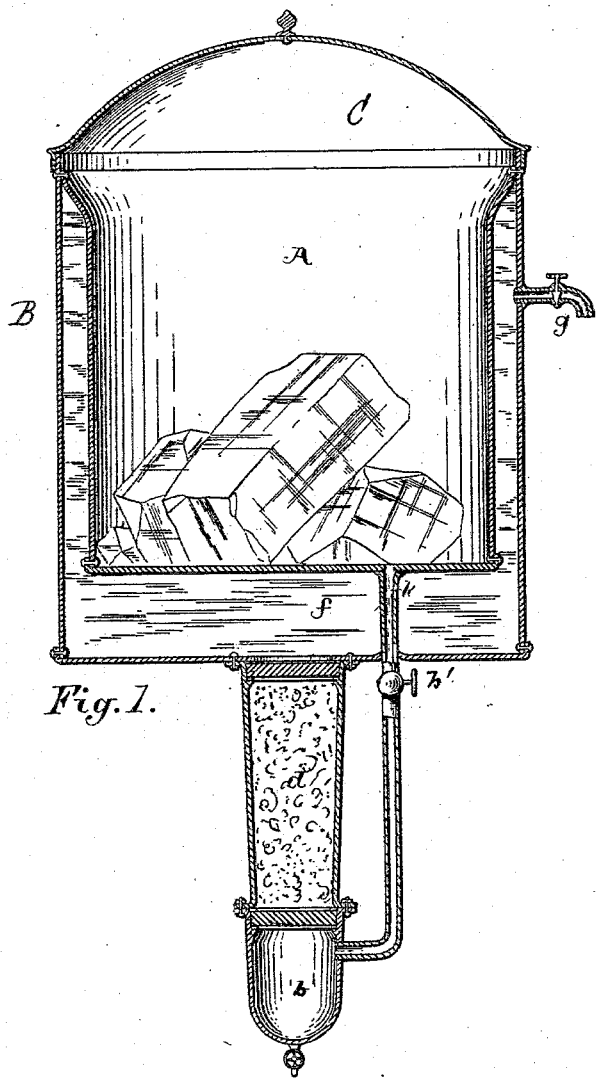
Figure 2:

Figure 1 is a section through my improved filter and cooler, showing one form of cooling-reservoir and ice-tank. Fig. 2 is a section of the top of the water-reservoir and ice-tank, showing a non-conducting covering applied to the outer face of the inclosing-case; and Fig. 3 is a section through a modified form of cooler in which a pipe or coil is used for holding the filtered water.

My invention relates to that class of coolers and filters in which the water is fed to the cooling-receptacle from the bottom thereof, and in which the ice is placed in a separate receptacle, so as not to come in contact with the filtered water; and the invention consists in connecting the ice tank or receptacle with the filter, whereby the drippings from the ice or water cooled by direct contact with the ice is caused to pass through the filter before reaching the outlet-cock.

It further consists in connecting the ice-tank, filter, cooling-receptacle, and outlet-cock, so as to form a continuous passage through the same, whereby the water is cooled before passing through the filter and afterward in its passage to the outlet-cock.

It further consists in a novel construction and arrangement of parts, whereby the water is cooled by direct contact with the ice before passing through the filter, and again cooled in passing around the outside of the ice-tank or through the coil after being filtered, all as hereinafter described.

In describing the apparatus the inclosing-case, filter, and sediment-chambers, and the manner of connecting them together, being made the subject of a separate application, will only be described herein so far as is necessary to an understanding of the present invention.

In Fig. 1 of the accompanying drawings I have shown one form of ice-receptacle or ice and water receptacle, which consists of a cylindrical case, A, fitting within the inclosing-case B, and connected thereto at its upper end by means of the bolts or rivets $a$, as shown. This ice-tank is of smaller diameter than the inclosing-case, and is of such depth as to leave a space between the outer face thereof and the inner face of the inclosing-case, which forms the receptacle for the filtered water, as shown at $f$. This case and tank are provided with a suitable cover, C, as shown. The filter and sediment-chambers are connected together and to the inclosing-case in a manner similar to that described in an application filed by me June 25, 1883. The lower end of the ice-tank has connected with it a pipe, $k$, extending therefrom and through the inclosing-case, and being connected at its lower end to the sediment-chamber $b$ in such manner that the drippings from the ice or the water placed in the ice-tank shall pass down through the same into and through the sediment-chamber and filter and thence to the cooling-chamber. This pipe may be provided with a suitable cock, as shown at $b'$, for regulating or cutting off the supply of water to the filter and cooling-chamber when desired.

In Fig. 3 a modification in the form of cooling-reservoir is shown, in which a coil is connected to the filter and wound around in spiral form to form an ice-receptacle, the coil, if desired, being surrounded by water, and the ice placed within the receptacle formed by the coil, in which case the pipe for conducting the dripping or ice water to the filter is connected directly to the bottom of the inclosing-case.

By this construction and arrangement of parts it will be seen that the water is thoroughly cooled before passing through the filter, and is again cooled in passing to the outlet-cock, either by coming in contact with the ice-tank or in passing through the coil, and that the water is thoroughly cooled and filtered before reaching the outlet-cock.

This construction of filter and cooler is particularly applicable for use on ships or cars, or in cities where there are no water-works.

Modifications in the form of the filter and sediment-chambers and of the cooling chamber or coil, and also the ice-tank, may be employed without departing from the spirit or intent of my invention.

Having now described my invention, I claim—

1. In a combined filter and cooler, an ice-tank or cooling-reservoir for holding the unfiltered water, a cooling chamber or coil located within or surrounding the same, and a filter connected to the cooling-chamber and located outside the chamber, in combination with a pipe for conveying the water from the ice-tank to the filter, substantially as and for the purpose described.

2. In a combined filter and cooler, an ice-tank or cooling-reservoir for holding the ice and unfiltered water, and a cooling chamber or coil for receiving and holding the filtered water, in combination with a filter connected to the chamber or coil, and a pipe for conveying the unfiltered water from the tank to the lower end of the filter, substantially as and for the purpose described.

3. In a combined filter and cooler, an ice-tank or cooling-reservoir and a filter and sediment-chamber, in combination with a cooling chamber or coil for holding the filtered water, connected to and supplied from the ice tank or cooling-reservoir, substantially as and for the purpose described.

4. In a combined cooler and filter, the ice tank or coil for holding the ice and unfiltered water, and a cooling-receptacle, in combination with a sediment-chamber and filter connected to the cooling-chamber, and a pipe for conveying the water from the tank to the cooling-chamber through the sediment-chamber and filter, substantially as and for the purpose set forth.

FRANK E. CADY.

Witnesses:
CHAS. O'BRIEN,
C. H. SHAPLEY.